United States Patent

[11] 3,556,026

| [72] | Inventor | Richard K. Houston |
| --- | --- | --- |
| | | Kansas City, Mo. |
| [21] | Appl. No. | 859,621 |
| [22] | Filed | Sept. 22, 1969 |
| [45] | Patented | Jan. 19, 1971 |
| [73] | Assignee | Agrecology, Incorporated |
| | | Kansas City, Mo. |
| | | a corporation of Missouri |
| | | Continuation-in-part of application Ser. No. 651,212, July 5, 1967, now abandoned. |

[54] FARMING METHOD
12 Claims, 6 Drawing Figs.

[52] U.S. Cl. ............................................. 111/1; 47/9, 47/58
[51] Int. Cl. ......................................... A01c 5/00
[50] Field of Search ........................................ 47/1.9, 26, 29; 111/1, (Methods)

[56] References Cited
UNITED STATES PATENTS

| 1,864,672 | 6/1932 | Rose et al. ................... | 47/9 |
| --- | --- | --- | --- |
| 2,949,871 | 8/1960 | Finn .............................. | 111/1 |
| 3,061,975 | 11/1962 | Hibshman et al. ............ | 47/9 |
| 3,121,973 | 2/1964 | Phillips et al. ................ | 47/9 |
| 3,180,290 | 4/1965 | Kappelmann et al. ......... | 47/9X |

*Primary Examiner*—Robert E. Bagwill
*Attorney*—Don M. Bradley

ABSTRACT: A farming method to conserve available rainfall comprising the forming of a plurality of elongated, spaced-apart, open-top slots in the soil surface and the construction of laterally extending, moisture transfer retarding barriers adjacent the slots to force rainfall from the adjacent field area into the slots. The slots are mulched to the top to minimize moisture loss through evaporation. The moisture transfer retarding barriers are formed by working the soil surface to enhance crusting, treating the soil with chemicals which congeal the soil, or by placement of water impervious sheet material.

PATENTED JAN 19 1971

INVENTOR.
RICHARD K. HOUSTON
BY Don M. Bradley
ATTORNEY

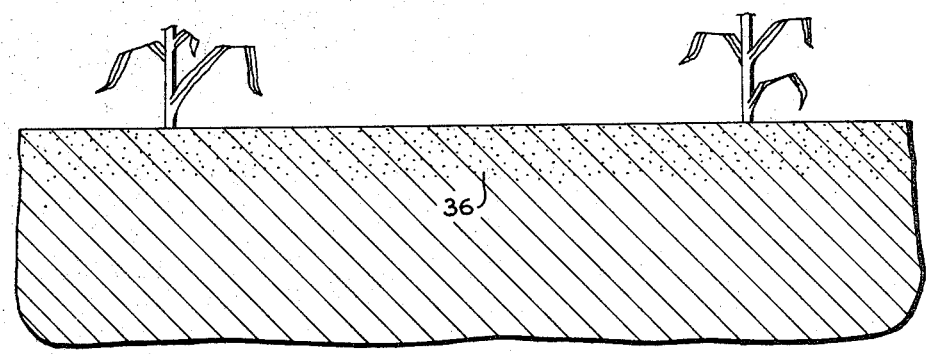
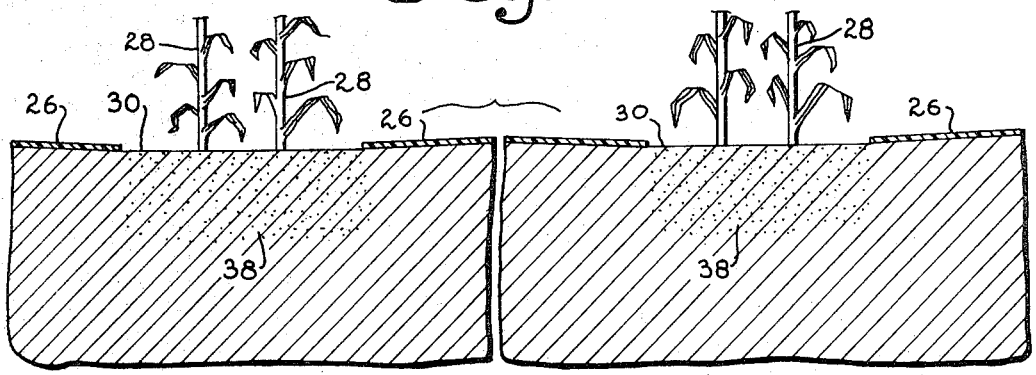
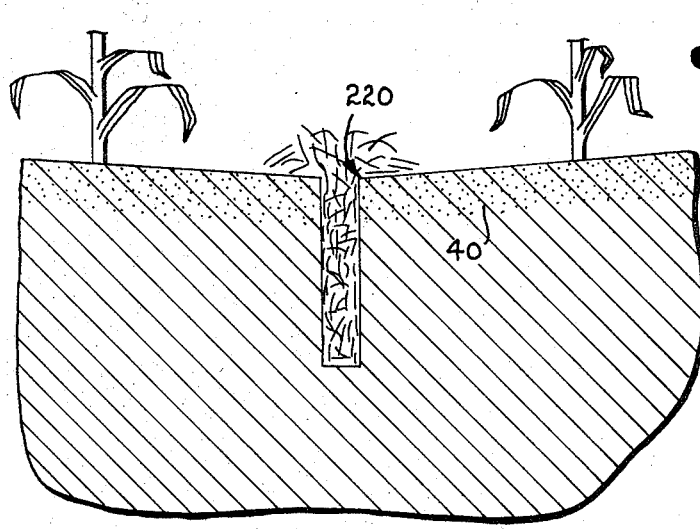

FARMING METHOD

This is a continuation-in-part of my copending application Ser. No. 651,212, filed July 5, 1967, (now abandoned) entitled "Farming Method."

This invention relates to agriculture, and more particularly, to a method of field preparation for maximum utilization of available rainfall.

In the past thirty years fertilizers, improved seeds and various agri-chemicals available to agriculture have caused a major yield revolution. Yet the lack of sufficient moisture available to the growing plants has in many farming areas seriously restricted the yield potential which would otherwise be available from these major improvements.

Even in the most ideal corn-producing areas of the United States, insufficient amounts of available moisture often reduces yield potential by at least an estimated 30 bushels of corn per acre. This yield limitation becomes progressively greater as one advances westward into the farming areas which are so dry that they will produce only one crop every other year. Ironically, the range country adjacent the marginal dry farming areas receives enough rain virtually every year to raise a yield of approximately 150 bushels of milo per acre. That is, if the available moisture is transpired rather than lost as evaporation and runoff. (Numerous experiments, where moisture loss has been prevented, have demonstrated that only 7 to 9 inches of water annually need be transpired to produce 100 to 150 bushels of milo or corn per acre.)

Accordingly, it is a primary object of this invention to provide a method of farming which will prevent loss of a portion of the rainfall which is available to a farming area.

Another very important object of the invention is to provide such a method which is economical to achieve.

Still a further object of this invention is to provide a method which may be continued from year to year so that most of the rainfall throughout the entire year is conserved to be made available to the crop during the growing season.

In the achievement of the foregoing objects, it is an important object of this invention to provide a method whereby the rainfall is received and forced relatively deeply into the soil where it is protected from runoff and from evaporation so that a maximum amount of moisture is available to the growing crop.

These and other important objects of the instant invention will be further explained, or will become apparent from the specification, claims and drawing.

In the drawings:

FIG. 4 is a fragmentary, partially diagrammatic, vertical, cross-sectional view of a field farmed by conventional farming methods;

FIG. 5 is a fragmentary view similar to FIG. 4 but illustrating a field prepared by one known method for minimizing water runoff and evaporation; and FIG. 6 is a view similar to FIG. 2, but illustrating a field prepared by conventional vertical mulching methods.

Figure 1:
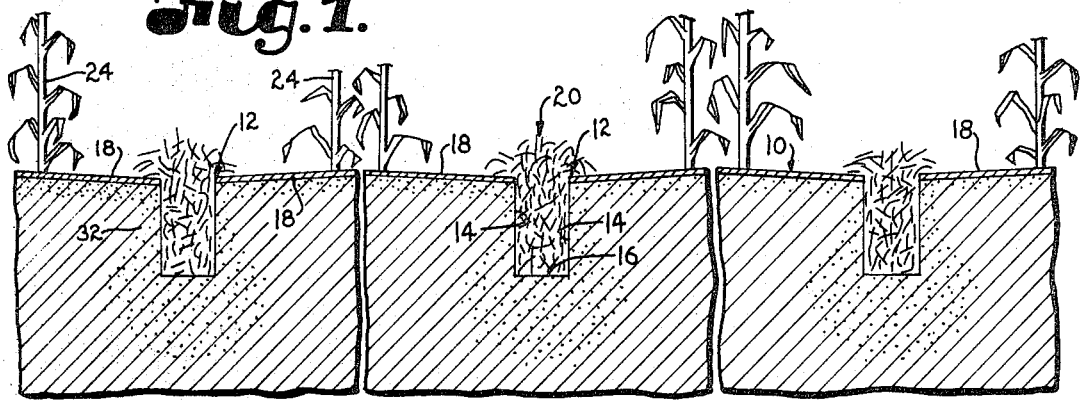
FIG. 1 is a fragmentary, partially diagrammatic, vertical cross-sectional view of a field prepared pursuant to the principles of this invention.

Referring initially to FIG. 1, the method of carrying out the principles of this invention in a typical field 10 includes the step of forming a plurality of vertically extending spaced-apart slots 12 in the field surface. Slots 12 may comprise a pair of opposite vertically extending side walls 14 interconnected by a bottom 16. The slots 12 are elongated and may extend parallel to one another throughout the entire length of a field. On the other hand, it is conceivable that for particular soil conditions as will be hereinafter discussed, the slots 12 might be formed intermittently across a field.

The slots may be formed in any desired manner. For example, the slots 12 could be constructed by use of conventional subsoiler type machinery. It is preferred, however, that the slots be formed by rotary blade type machines which not only dislodge the soil to form the slot, but also remove the soil from the region of the slot to avoid compacting the sides and bottom of the slot as much as possible.

Another step in practicing the method of this invention is the construction of a laterally extending moisture transfer retarding barrier in the region of the field between the slots. In FIG. 1, the barriers between each pair of adjacent slots are designated by the reference numeral 18.

The barriers 18 may be formed in any of a number of satisfactory manners. Probably the most economical manner of forming barriers 18 is by working the soil surface between the slots 12 so that the soil is predisposed to crust. The crust formed at the soil surface by normal climatic action serves to render the soil surface relatively impermeable to the transfer of moisture through the barriers 18.

One means of working the soil to accomplish the foregoing condition is by pulverizing the soil adjacent the soil surface. The pulverized soil contains relatively smaller interstices than the underlying soil and will crust when subjected to rainfall and other normal climate conditions. The crusting action can be enhanced by the application of forces to the soil surface which have a tendency to pack the soil. Manifestly, a practical method of packing the soil surface is achieved through operation of a conventional roller or the like over the surface.

It is important that the trenches 12 remain substantially more permeable to water than the barriers 18. Accordingly, it has been found that the addition of a quantity of mulch material 20 into the trenches 12 prevents the top of the latter from sealing or becoming filled with soil or foreign matter. Even, however, should soil become mixed with the mulch material in the slot, the mulch material content will preserve the relative permeability of the slot region for reception of water from watershedding areas and to conduct the water deeply into the soil. The mulch material 20 also preserves the integrity of the slots 12 and provides a desirable environment for the action of worms into the adjacent soil regions. The worm action radiating from the slots 12 provides aeration channels and also enhances the permeability of the soil.

When a packed soil surface is provided to present the barriers 18, there may be considerable soil temporarily dislodged by splash action in a rain. Some of this dislodged soil may tend to move to the slots 12 during an intense rain. This can cause the surface of the slots to become sealed over with soil. It has been found that this problem may be avoided by stuffing the slot with mulch material 20 in such a manner that a part of the mulch material protrudes above the upper surface of the slot.

Figure 3:
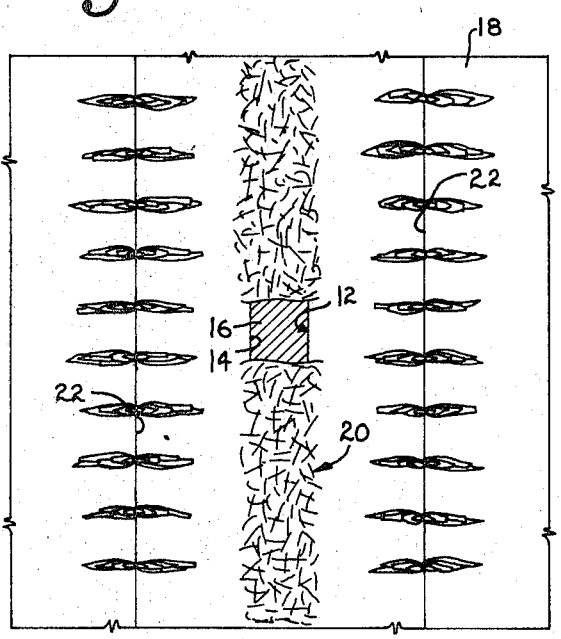
FIG. 3 is a fragmentary, top plan view of the field of FIG. 1.

The crop may be planted in relatively close proximity to the slots 12 or at least in positions to obtain the increased moisture transferred to the lower soil profile through the slots. To this end, vertically extending openings can be formed in the soil surface extending through the barriers 18 to receive the seed or plants. The openings may take the form of elongated slits 22 (FIG. 3) formed by a rolling disc or cutter. Alternatively, the slots 22 may be formed through the barriers 18 by the use of a slicing tool such as a corn planter runner or the like. Obviously, a series of individual holes to accommodate the respective seeds or plants could be formed through the barriers 18 if desired.

The barriers 18 provide a relatively impermeable watershed surface disposed to receive a substantial amount of rainfall available to field 10. Water from the areas 18 is forced from these surface barriers to run into the highly permeable slots 12. The runoff is received into the slots from whence it is absorbed into the adjacent soil regions.

Figure 2:
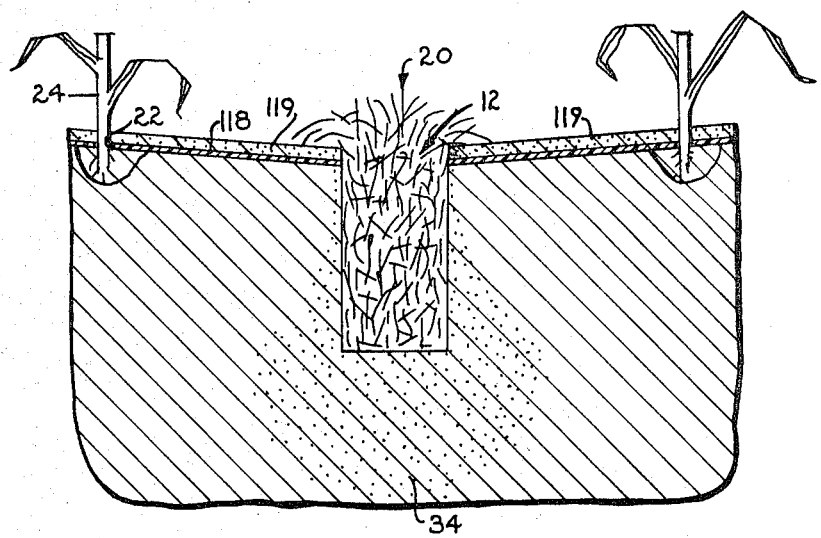
FIG. 2 is a fragmentary view similar to FIG. 1 but on a larger scale and illustrating a modified form of practicing the method of this invention.

FIG. 2 of the drawing shows a modified method of practicing this invention. The slots 12 may be formed identically with those shown in FIG. 1 and the slots are filled with the mulch material 20. However, the barriers 118 extending between the pairs of the adjacent slots 12 in the modification of FIG. 2 are constructed by the placement of added materials rather than the working of the soil surface.

A number of materials are available which have the property of reacting with the soil to provide a totally or partially impervious layer. One such chemical is Arquad 2HT 75 manufactured by Armor and Company. When sprayed as a thin layer at about 40 pounds per acre, many soils become relatively impermeable. Obviously, similar acting chemicals could be used for this purpose. The chemical layer may be imbedded under a layer 119 of earth for added protection to the barrier.

The watershedding barriers 118 may also be constructed from relatively impermeable or entirely impermeable sheet material such as plastic or the like. The sheet material may be spread on between the slots to direct rainfall into one of the adjacent slots 12. When the barrier spans the entire distance between slots, openings 22 are provided in the sheet material 118 to receive the plants 24.

The manner in which the method of this invention operates to conserve available moisture may perhaps be best explained by comparison with presently known conventional or experimental systems. FIG. 5 of the drawing illustrates an example of moisture conservation practices which have been carried out at Colorado State University. These practices are generally called the "microwatershed system." The method used has been to create wide, elevated, relatively impermeable watershedding areas 26 between rows 28 of corn. The watershedding area 26 has been about 6 feet wide. The water receiving areas 30 have been 18 inches wide and contain the double row of corn as shown in FIG. 5. The prevention of the penetration of a portion of a rain on the watershedding areas forces additional moisture onto the cropped strip 30. This moisture when added to that which has fallen directly on the cropped area 30 causes a much deeper moisture penetration than would normally occur. Obviously, that part of the moisture which is forced more deeply into the soil is less subject to evaporation losses than it would otherwise be.

The microwatershed system has had several basic problems. Relatively small rains are not used very efficiently because they are not forced deeply enough into the soil. A relatively high percent of the rains in the Great Plains farming areas each produce less than about one-half inch.

Further, when heavy rains do occur, frequently more water is forced onto the limited intake areas 30 than they are capable of absorbing. Consequently, there is runoff from the field. Thirdly, if dikes are constructed to hold this runoff water, the water frequently ponds on the intake area and the crop suffers from poor aeration.

These limitations are greatly reduced by the alterations of the watershedding areas and particularly by changing the water receiving areas as shown and described in FIGS. 1 and 2 of the drawing. Essentially, the strip between the watershedding barriers is narrowed in the invention from 18 to the width of the respective slots 12. Whereas the precise slot width may vary depending upon existing soil conditions, good results may normally be achieved when the slots 12 are approximately 2 to 6 inches in width. Slots 4 inches wide have been found to be about optimum for soil conditions in which this invention has been practiced.

The water receiving areas are then extended downwardly by virtue of the construction of the slots 12. The depth of the slots may also vary from between about 5 to 10 inches. Slots approximately 7 inches in depth and 4 inches in width have been found optimum in the soils in which the method has been utilized. The mulch material used to fill the slots 12 is preferably crop residue and the watershedding area or barriers 18 are preferably approximately 5 feet wide and extend from the edge of one slot 12 to the edge of the next adjacent slot 12. The crop rows 24 have been planted within 9 inches of each side of the respective slots.

The water-receiving mulched trench aspects of the invention bear certain similarities to the vertical mulch experiments which are known to those skilled in the art and which were carried on initially by Purdue University in Indiana. This work showed that the mulch stabilized the sides of the slots against cave-in, made the sides extremely porous and provided ideal conditions for intense worm activity further on into the soil.

By combining the watershed concepts with the vertical mulch, and assuming that the trenches are 7 inches by 4 inches by 7 inches on centers 5 feet apart, 56 inches of water repelling area has 18 inches of stable, highly permeable intake surface combined with worm channels further on into the soil. The slot can also retain below the surface almost one-half inch of rain (28 cubic inches off a 56 inch surface) in the slot itself. This temporary storage capacity has an added effect of providing a sizable hydraulic head against the lower sides of the slot. Thus, excessive runoff is prevented while poor aeration of surface areas is avoided by rapidly channeling the water more deeply into the profile.

In those areas subject to moisture in excess of soil storage capacity, the system can also be used to remove this excess from the field by connecting the mulched slots to tiles or other types of water removal conduits.

The combination of concepts in this invention also radically decreases evaporative loss because of its effect on the distribution of moisture in the soil from the highly important intense smaller rains. This effect on distribution may be visualized by the diagrammatic representations in FIGS. 1, 2 and 4—6 of the drawings. The stippled region 32 in FIG. 1 represents the approximate zone of water distribution in the method of this invention utilizing a crusted earth watershedding barrier 18. Note that some water following a rainfall permeates the crust to a shallow depth beneath barriers 18. The great bulk of the water is forced by the barriers into the slots 12 and the relatively deep penetration adjacent the slots 12 is illustrated by region 32.

On the other hand, when an impermeable barrier formed from chemicals or sheet material 118 is used, the entire rainfall is forced into the slots. The region 34 in FIG. 2 shows the water distribution emanating from the slot. It is to be noted that the barriers 118 protect the underlying regions from evaporation.

FIG. 4 shows the conventional cropping method devoid of watershedding barriers or mulched slots. Region 36 generally indicates the depth of penetration of the water uniformly over the field. This water in the upper soil region is highly susceptible to evaporation loss. Further, the absence of water receiving trenches or slots can result in substantial runoff loss in heavy rains.

The microwatershed illustrated in FIG. 5 forces the water toward the cropped strip 30. Region 38 illustrates the general water distribution pattern from such strips. The disadvantages from runoff and evaporation losses attendant upon the method illustrated in FIG. 5 have been previously explained.

FIG. 6 generally illustrates the vertical mulch techniques heretofore explained. Note the distribution pattern represented by region 40 wherein most of the water permeates directly into the soil between the slots. This is, of course, subject to high evaporation loss and demonstrates why the Purdue System never had much effect on the type of rains most subject to evaporation.

On practically all normally tilled fields the surface is sufficiently permeable that the only type rain that would go into the vertical mulch would either be water from a heavy intense rain or from smaller rains in a wet season. The entire profile would be wet anyway during a wet season. In the case of the heavy, intense rain, the initial permeability of most soils is quite high so even when water would go into the slot, it would not be affected substantially differently by evaporation than water that went through the soil surface. Deeper moisture from either slot or surface would be sufficiently far from the top that it would not be particularly subject to evaporation anyway. Normally, while a crop is growing, moisture below about 4 or 5 inches from the surface is not subject to appreciable evaporation loss.

Soil and climatic variations may dictate some variation in slot depth, closeness and width. It is envisioned that crop residue will normally be the primary source of mulch material. When residue is quite heavy, the slot size may require enlargement to accommodate the residue. Conversely, when residue is limited, the slot may be narrowed or possibly mulch may be deposited only in the top region of the slot.

In fields having a topsoil of average permeability but a lower soil that is highly permeable, the slot must not extend completely through the less permeable horizon or a droughty condition may result. On the other hand, fields with plow pan or hard pan may require a narrower and deeper slot extending through or at least into the less permeable area.

Once constructed, the slots 12 may be utilized from year to year. On the other hand, if the integrity of the slots tends to diminish as a result of erosion or the like, the slots may be reconstructed as necessary. Manifestly, it will often be desirable to construct the new slots in laterally displaced relationships from the previous slots. This provides an excellent opportunity for the introduction of lime or other beneficial constituents into the lower soil regions and distribution of these constituents across the field by successive relocation of the slots. Progressive movements of the slots across the field bring the soil constituents to the conditions desired.

A slight slope toward slots 12 is illustrated in FIGS. 1 and 2. Actually, very little if any slope is desirable when the barriers 18 are constructed from soil predisposed to crusting since the slope may tend to erode the soil. It is sufficient to say that the barriers 18 and 118 should be sloped only an amount necessary to force the water falling on the barrier or watershed area toward and into the respective slots.

"Imported" impermeability materials such as Arquad 2HT 75 or plastic or other sheet material may be relatively expensive. Such materials can be limited to only an 18 to 24 inch strip in the vicinity of the growing crop. This is the surface area from which a high percent of the soil moisture would otherwise evaporate and these impermeable strips will reduce evaporation to the maximum.

Conventional planting practices are desirably altered to fit the present method. Two rather closely spaced rows adjacent each slot are desirable. The rows increase the shading of the soil which has the higher moisture level, mainly in the slot, slowing down evaporation to give the root system the opportunity to extract the moisture prior to evaporation. Planting should be carried out with a minimum disturbance of the watershed barrier surface. Crops other than corn or milo may be grown pursuant to this method. For example, the slots 12 may be placed on 36 inch centers for growing wheat. The wheat rows, planted 9 inches from the center of each slot, are then spaced approximately 18 inches apart.

It will be apparent to those skilled in the art that the method of this invention combines the best features of the micro-watershed concept with the opportunity for deep water penetration available from vertical mulching without the disadvantages existing with respect to either of these concepts. Most of the rainfall occurring in the farming region is forced to the slots for deep penetration into the soil. There is minimal loss from runoff and most of the moisture is protected against evaporation loss by the mulch in the slot and by the relatively impermeable barrier. The slots conduct the water beneath the surface to avoid excessive pooling or aeration problems. The water finds its way into the profile relatively quickly as a result of the intense worm action within the slots.

I claim:

1. A method of farming a field to conserve moisture, said method comprising:
   forming a plurality of vertically and longitudinally extending, spaced apart slots in the soil surface;
   placing relatively porous mulch material in the slots; and
   constructing laterally extending moisture transfer retarding barriers adjacent corresponding slots, an edge of each barrier terminating in sufficiently close proximity to the adjacent slot for runoff of water from the barrier into the slot, whereby the barriers force water runoff from the field into the corresponding slots and minimize water evaporation loss from the field.

2. The invention of claim 1, wherein mulch material in the slots is at least coextensive with the surface of the soil.

3. The invention of claim 2, wherein mulch material protrudes above the soil surface.

4. The invention of claim 1, wherein said moisture transfer retarding barriers substantially span the distance between adjacent pairs of said slots.

5. The invention of claim 1, wherein each of said slots is formed to dimensions of between approximately 2 to 6 inches in width and of between approximately 5 to 10 inches in depth.

6. The invention of claim 5, wherein each of said slots is formed to dimensions of approximately 4 inches in width and approximately 7 inches in depth.

7. The invention of claim 1, wherein said barrier is constructed by pulverizing the soil adjacent the soil surface to enhance crusting and to retard vertical transfer of moisture through the pulverized soil.

8. The invention of claim 7, wherein is included the step of applying packing forces to the soil after the pulverizing thereof.

9. The invention of claim 1, wherein the said barrier is constructed by treating the soil with a chemical having the property of congealing the soil to present a water impervious barrier.

10. The invention of claim 1, wherein said barrier is constructed by placing a layer of water-impervious sheet material across said soil.

11. The invention of claim 1, wherein a crop is planted between the slots and proximal the latter for proliferation of the crop roots in the region of enhanced moisture from the slots.

12. The invention of claim 11, wherein said crop is planted in openings formed in the corresponding barrier.